(12) United States Patent
Dinn

(10) Patent No.: US 11,573,939 B2
(45) Date of Patent: *Feb. 7, 2023

(54) PROCESS AND APPARATUS FOR SELECTING AN ITEM FROM A DATABASE

(71) Applicant: Kannuu Pty Ltd., Mount Kuring-Gai (AU)

(72) Inventor: Kevin W. Dinn, Mount Kuring-Gai (AU)

(73) Assignee: KANNUU PTY LTD., Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/539,501

(22) Filed: Aug. 13, 2019

(65) Prior Publication Data

US 2020/0278952 A1 Sep. 3, 2020

Related U.S. Application Data

(63) Continuation of application No. 16/226,109, filed on Dec. 19, 2018, now abandoned, which is a (Continued)

(30) Foreign Application Priority Data

Aug. 12, 2005 (AU) .............................. 2005904378

(51) Int. Cl.
*G06F 16/22* (2019.01)
*G06F 16/24* (2019.01)
(Continued)

(52) U.S. Cl.
CPC ........ *G06F 16/2228* (2019.01); *G06F 3/0338* (2013.01); *G06F 3/0482* (2013.01);
(Continued)

(58) Field of Classification Search
None
See application file for complete search history.

(56) References Cited

U.S. PATENT DOCUMENTS 3,937,939 A 2/1976 Frenkel
5,128,672 A 7/1992 Kaehler
(Continued)

FOREIGN PATENT DOCUMENTS

CN 1199302 11/1998
DE 3123596 6/1981
(Continued)

OTHER PUBLICATIONS

European Search Report dated Dec. 1, 2006 for PCT/AU2002/01114.
(Continued)

*Primary Examiner* — Son T Hoang
(74) *Attorney, Agent, or Firm* — Jones Day

(57) ABSTRACT

A method and apparatus for selecting database items from a database, where the database items are indexed by a list of item identifiers. The item identifiers may be in the form of text. An initial display is generated which includes one or more parts of the item identifiers. Selection of the one or more parts may be made and results in the generation of a display of a further one or more parts for selection. The further one or more parts may be selected in order to add to the selected one or more parts to build a larger part or whole of an item identifier. Selection from a large list of item identifiers may be carried out in a relatively short time period.

1 Claim, 9 Drawing Sheets

Related U.S. Application Data continuation of application No. 15/791,992, filed on Oct. 24, 2017, now abandoned, which is a continuation of application No. 15/232,511, filed on Aug. 9, 2016, now Pat. No. 9,836,489, which is a continuation of application No. 14/627,914, filed on Feb. 20, 2015, now Pat. No. 9,436,354, which is a continuation of application No. 14/166,465, filed on Jan. 28, 2014, now Pat. No. 8,996,579, which is a continuation of application No. 13/736,548, filed on Jan. 8, 2013, now Pat. No. 8,676,852, which is a continuation of application No. 13/349,204, filed on Jan. 12, 2012, now Pat. No. 8,375,058, which is a continuation of application No. 11/990,338, filed as application No. PCT/AU2006/001151 on Aug. 11, 2006, now Pat. No. 8,140,560.

(51) Int. Cl.
| | | |
|---|---|---|
| *G06F 16/95* | (2019.01) | |
| *G06F 16/245* | (2019.01) | |
| *G06F 16/248* | (2019.01) | |
| *G06F 16/957* | (2019.01) | |
| *G06F 16/2457* | (2019.01) | |
| *H04M 1/2748* | (2020.01) | |
| *G06F 3/0338* | (2013.01) | |
| *G06F 3/0482* | (2013.01) | |
| *G06F 3/04842* | (2022.01) | |

(52) U.S. Cl.
CPC ........ *G06F 3/04842* (2013.01); *G06F 16/248* (2019.01); *G06F 16/24578* (2019.01); *G06F 16/957* (2019.01); *H04M 1/2748* (2020.01)

(56) References Cited

U.S. PATENT DOCUMENTS

| | | |
|---|---|---|
| 5,223,924 A | 6/1993 | Strubbe |
| 5,263,174 A | 11/1993 | Layman |
| 5,299,125 A | 3/1994 | Baker et al. |
| 5,398,023 A | 3/1995 | Murray |
| 5,496,992 A | 3/1996 | Madan et al. |
| 5,633,912 A | 5/1997 | Tsoi |
| 5,724,069 A | 3/1998 | Chen |
| 5,754,655 A | 5/1998 | Hughes et al. |
| 5,787,417 A | 7/1998 | Hargrove |
| 5,797,098 A * | 8/1998 | Schroeder ......... G06F 16/24578 |
| 5,867,799 A | 2/1999 | Lang |
| 5,894,276 A | 4/1999 | Altidor et al. |
| 5,896,321 A | 4/1999 | Miller et al. |
| 5,901,222 A | 5/1999 | Macor |
| 5,911,485 A | 6/1999 | Rossman |
| 5,953,541 A | 9/1999 | King et al. |
| 5,983,214 A | 11/1999 | Lang |
| 6,009,444 A | 12/1999 | Chen |
| 6,011,554 A | 1/2000 | King et al. |
| 6,032,053 A | 2/2000 | Schroeder et al. |
| 6,047,196 A | 4/2000 | Makela et al. |
| 6,055,439 A | 4/2000 | Helin et al. |
| 6,150,962 A | 10/2000 | Rossmann |
| 6,144,378 A | 11/2000 | Lee |
| 6,223,059 B1 | 4/2001 | Haestrup |
| 6,247,043 B1 | 6/2001 | Bates et al. |
| 6,264,146 B1 | 7/2001 | Hill et al. |
| 6,311,125 B1 | 10/2001 | Okano et al. |
| 6,377,965 B1 | 4/2002 | Hachamovitch et al. |
| 6,580,932 B1 | 6/2003 | Finke-Anlauff |
| 6,593,913 B1 * | 7/2003 | Krohn ..................... G06F 16/26 |
| 6,744,423 B2 | 6/2004 | Kraft et al. |
| 6,748,242 B1 | 6/2004 | Dunleavy |
| 6,792,287 B1 | 9/2004 | Tuomela et al. |
| 6,801,659 B1 | 10/2004 | O'Dell |
| 6,826,566 B2 | 11/2004 | Lewak et al. |
| 7,152,213 B2 * | 12/2006 | Pu ........................... G06F 16/20 |
| 7,185,286 B2 | 2/2007 | Zondervan et al. |
| 7,443,316 B2 | 10/2008 | Lim |
| 7,487,147 B2 | 2/2009 | Bates et al. |
| 7,543,244 B2 | 6/2009 | Matthews et al. |
| 7,616,191 B2 | 11/2009 | Matta |
| 7,669,111 B1 | 2/2010 | Krause et al. |
| 7,793,228 B2 | 9/2010 | Mansfield et al. |
| 7,836,044 B2 | 11/2010 | Kamvar et al. |
| 7,886,233 B2 | 2/2011 | Rainisto et al. |
| 8,798,237 B2 | 8/2014 | Lee |
| 2001/0012769 A1 | 8/2001 | Sirola et al. |
| 2001/0018351 A1 | 8/2001 | Hino et al. |
| 2002/0049795 A1 | 4/2002 | Freeman |
| 2002/0061770 A1 | 5/2002 | Ozaki |
| 2002/0078013 A1 * | 6/2002 | Josenhans ............ G06F 16/248 |
| 2002/0087979 A1 | 7/2002 | Dudkiewicz et al. |
| 2002/0091690 A1 | 7/2002 | Bailey et al. |
| 2002/0113825 A1 * | 8/2002 | Perlman ............... G06F 16/2228 |
| 2002/0151327 A1 | 10/2002 | Levitt |
| 2002/0183099 A1 | 12/2002 | Lee |
| 2003/0073414 A1 | 4/2003 | Capps |
| 2003/0078069 A1 | 4/2003 | Lindeman |
| 2003/0095102 A1 * | 5/2003 | Kraft .................... G06F 16/2228 |
| 2003/0129570 A1 | 7/2003 | Alabaster |
| 2003/0182274 A1 | 9/2003 | Oh |
| 2004/0021691 A1 * | 2/2004 | Dostie ................... G06F 16/245 |
| | | 707/999.003 |
| 2004/0105714 A1 | 6/2004 | Eo |
| 2004/0125073 A1 | 7/2004 | Potter et al. |
| 2004/0163032 A1 | 8/2004 | Guo et al. |
| 2004/0186819 A1 | 9/2004 | Baker |
| 2004/0192276 A1 | 9/2004 | Wesby |
| 2004/0227732 A1 | 11/2004 | Kemppinen |
| 2005/0010605 A1 | 1/2005 | Conrad et al. |
| 2005/0043063 A1 | 2/2005 | Dinn |
| 2005/0188330 A1 | 8/2005 | Griffin |
| 2005/0233769 A1 | 10/2005 | Tanaka et al. |
| 2005/0270270 A1 | 12/2005 | Chadha |
| 2006/0009861 A1 | 1/2006 | Bonasia et al. |
| 2006/0031591 A1 | 2/2006 | Hollstrom et al. |
| 2006/0146028 A1 | 7/2006 | Chang et al. |
| 2006/0164382 A1 | 7/2006 | Kulas et al. |
| 2006/0217953 A1 | 9/2006 | Parikh |
| 2006/0221058 A1 | 10/2006 | Fux et al. |
| 2006/0265208 A1 | 11/2006 | Assadollahi |
| 2006/0265648 A1 | 11/2006 | Rainisto |
| 2006/0265668 A1 | 11/2006 | Rainisto |
| 2006/0276234 A1 | 12/2006 | Kang et al. |
| 2006/0293889 A1 | 12/2006 | Kiss et al. |
| 2006/0294462 A1 | 12/2006 | Blair et al. |
| 2007/0016862 A1 | 1/2007 | Kuzmin |
| 2007/0060114 A1 | 3/2007 | Ramer et al. |
| 2007/0080949 A1 | 4/2007 | Chung et al. |
| 2007/0089070 A1 | 4/2007 | Jaczyk |
| 2007/0179776 A1 | 8/2007 | Segond et al. |
| 2008/0059915 A1 | 3/2008 | Boillot |
| 2008/0235621 A1 | 9/2008 | Boillot |
| 2008/0259022 A1 | 10/2008 | Mansfield et al. |
| 2009/0192786 A1 | 7/2009 | Assadollahi |
| 2009/0327888 A1 | 12/2009 | Woolf et al. |
| 2010/0010963 A1 | 1/2010 | Dinn |
| 2012/0023433 A1 | 1/2012 | Choi et al. |

FOREIGN PATENT DOCUMENTS

| | | |
|---|---|---|
| DE | 10019727 | 10/2001 |
| EP | 624965 | 11/1994 |
| EP | 789224 | 8/1997 |
| EP | 1022644 | 7/2000 |
| FR | 2751442 | 1/1998 |
| GB | 2317531 | 9/1998 |
| GB | 2357220 | 6/2001 |
| GB | 2363290 | 12/2001 |
| JP | 09-083402 | 7/1995 |
| JP | 407240776 | 9/1995 |
| JP | 10293640 | 11/1998 |
| JP | 2000267787 | 9/2000 |
| JP | 2002149345 | 5/2002 |

(56) References Cited

FOREIGN PATENT DOCUMENTS

| | | |
|---|---|---|
| JP | 2005-159250 | 7/2005 |
| NL | 1011027 | 9/2000 |
| WO | 2000/049731 | 8/2000 |
| WO | 2000/059181 | 10/2000 |
| WO | 2001/005047 | 1/2001 |
| WO | 2001/067725 | 9/2001 |
| WO | 2002/008876 | 1/2002 |
| WO | 2002/013001 | 2/2002 |
| WO | WO 02/39244 | 5/2002 |
| WO | WO 2002/069240 | 9/2002 |
| WO | 2002/093338 | 11/2002 |
| WO | WO 2002/091160 | 11/2002 |
| WO | 2003021418 | 3/2003 |
| WO | WO 03/077102 | 9/2003 |
| WO | WO 2004/017188 | 2/2004 |
| WO | 2005/064445 | 7/2005 |
| WO | 2006/100505 | 9/2006 |
| WO | 2007/019610 | 2/2007 |
| WO | WO 2008/080192 | 7/2008 |
| WO | WO 2008/106729 | 9/2008 |

OTHER PUBLICATIONS

International Search Report dated Apr. 8, 2008 from International Application No. PCT/AU2008/000297.
International Search Report dated Feb. 6, 2008 from International Application No. PCT/AU2007/002010.
International Search Report dated Oct. 25, 2002 from International Application No. PCT/AU2002/001154.
International Search Report dated Aug. 29, 2006 from International Application No. PCT/AU2006/001151.
International Search Report dated Oct. 16, 2002 from International Application No. PCT/AU2002/01114.
"It's a Nokia . . . Game Boy Advance?", Jorgen Sundgot, InfoSyncWorld, Oct. 11, 2001 <http://www.infosyncworld.com/news/n/986.html>.
"iTAP" Predictive Text Input Technology Technical Paper Lexicus, a Division of Motorola, Version 1.0, Jun. 26, 2002, pp. 1-11. Retreived from the Internet on Aug. 28, 2006 at URL: http://www.toptrend.com.tw/library/product%20line/Lexicus/iTAP/ITAP%20Technical%20Paper %20for%20ESC.pdf.
"New Nokia 5510 is Entertainment Phone", Ana Leticia Sigvartsen, InfoSatellite.com, Oct. 11, 2001, <http://www.infosatellite.com/news/2001/10/a111001nokia_5510.htm>.
"Nokia 5510 User's Guide", Copyright 2001-2002, Selected Pages. Available at: <http://nds1.nokia.com/phones/files/guides/5510_usersguide_en.pdf>.
<www. francemobiles.com/telmob/pack/itineris/pa086271.php?from=aol>.
Examination Report dated Apr. 11, 2008 from Australian Application No. 2002331407.
First Office Action dated Mar. 10, 2006 for Chinese Patent Application No. 02825059.1.
Supplemental Search Report dated Dec. 1, 2006 for European Patent Application No. 02766922.5.
Examination Report dated Nov. 15, 2010 for European Patent Application No. 02766922.5.
Examination Report dated Feb. 17, 2010 for European Patent Application No. 02766922.5.
Examination Report dated Oct. 17, 2007 for European Patent Application No. 02766922.5.
Examination Report dated May 22, 2007 for European Patent Application No. 02766922.5.
Supplemental Search Report dated Feb. 19, 2007 for European Patent Application No. 02766922.5.
Supplemental Search Report dated Mar. 2, 2011 for European Patent Application No. 08714345.
First Office Action dated Feb. 12, 2010 for Chinese Patent Application No. 200710153468.4.
Examination Report dated Jun. 22, 2011 for Australian Patent Application No. 2010200095.

Examination Report dated Sep. 29, 2009 for New Zealand Patent Application No. 566172.
Examination Report dated Apr. 12, 2011 for New Zealand Patent Application No. 566172.
First Office Action dated Jun. 26, 2009 for Chinese Patent Application No. 2006800364961.
Examination Report dated Feb. 10, 2010 for Singapore Patent Application No. 200801128-0.
Examination Report dated Oct. 29, 2010 for Australian Patent Application No. 2006281970.
"Optimizing predictive text entry for short message service on mobile phones" by How et al. School of Computing, National University of Singapore, 2005. Retrieved from the Internet: http://en.scientificcommons.org/43594032.
"An Efficient Text Input Method for Pen-based Computers" by Toshiyuki Masui, Sony Computer Science Laboratory Inc., Shinagawa, Tokyo, Japan. In: Proceedings of the ACM Conference on Human Factors in Computing Systems (CHI'98), Apr. 1998. Retrieved from the Internet: http://www.pitecan.com/papers/CHI98/CHI98.pdf.
Various Website Screenshots for WayBackMachine for n-e-ware.com and related websites; Various Dates.
"The Use of Syntax in Word Completion Utilities" by Afsaneh Fazly, Graduate Department of Computer Science, University of Toronto, 2002, Retrieved from the Internet: http://www.cs.toronto.edu/pub/gh/Fazly-thesis.pdf.
KeyStick Text Entry System for Series 60 Mobile Phones Version 2.8.0; 2003.
International Search Report dated Jan. 15, 2002 from International Patent Application No. PCT/AU2002/001467.
Office Action dated Sep. 27, 2011 for Japanese Application No. 2008-525341 with English Translation.
Communication from European Patent Office dated Apr. 16, 2013 for EP 06774802.
Ali K., Van Stam, W., TiVo: Making Show Recommendations Using A Distributed Collaborative Filtering Architecture, pp. 294-401, KDD 2004, Seattle, WA 2004.
Patent Owner's Response Under 37 C.F.R. § 42.120 (redacted), Case IPR 2020-738, Jan. 7, 2021.
Patent Owner's Response Under 37 C.F.R. § 42.120 (redacted), Case IPR 2020-737, Jan. 7, 2021.
Exhibit 2024 (Second Expert Declaration of R. Balakrishnan) from Patent Owner's Response Under 37 C.F.R. § 42.120 (redacted), Case IPR 2020-737 and Case IPR 2020-738, Jan. 7, 2021.
Exhibit 2025 (Colin Dixon Declaration) from Patent Owner's Response Under 37 C.F.R. § 42.120 (redacted), Case IPR 2020-737 and Case IPR 2020-738, Jan. 7, 2021.
Exhibit 2026 (Colin Dixon bio) from Patent Owner's Response Under 37 C.F.R. § 42.120 (redacted), Case IPR 2020-737 and Case IPR 2020-738, Jan. 7, 2021.
Exhibit 2027 (Clifton Forlines_PDF Tran) from Patent Owner's Response Under 37 C.F.R. § 42.120 (redacted), Case IPR 2020-737 and Case IPR 2020-738, Jan. 7, 2021.
Exhibit 2032 (Viegut_Declaration-tviegut_tkv6strategies.com Redacted) from Patent Owner's Response Under 37 C.F.R. § 42.120 (redacted), Case IPR 2020-737 and Case IPR 2020-738, Jan. 7, 2021.
Exhibit 2033 (354 Claim Chart Updated—Claims and POC) from Patent Owner's Response Under 37 C.F.R. § 42.120 (redacted), Case IPR 2020-737 and Case IPR 2020-738, Jan. 7, 2021.
Exhibit 2034 ( 393 Claim Chart Updated—Claims and POC) from Patent Owner's Response Under 37 C.F.R. § 42.120 (redacted), Case IPR 2020-737 and Case IPR 2020-738, Jan. 7, 2021.
Exhibit 2035 (Samsung bdh8500 Manual) from Patent Owner's Response Under 37 C.F.R. § 42.120 (redacted), Case IPR 2020-737 and Case IPR 2020-738, Jan. 7, 2021.
Exhibit 2036 (Samsung E Manual) from Patent Owner's Response Under 37 C.F.R. § 42.120 (redacted), Case IPR 2020-737 and Case IPR 2020-738, Jan. 7, 2021.
Exhibit 2041 (US20060276234A1) from Patent Owner's Response Under 37 C.F.R. § 42.120 (redacted), Case IPR 2020-737 and Case IPR 2020-738, Jan. 7, 2021.
Exhibit 2042 (Dostie Reference—US20060276234A1) from Patent Owner's Response Under 37 C.F.R. § 42.120 (redacted), Case IPR 2020-737 and Case IPR 2020-738, Jan. 7, 2021.

(56) References Cited

OTHER PUBLICATIONS

Exhibit 2043 (US20120023433A1) from Patent Owner's Response Under 37 C.F.R. § 42.120 (redacted), Case IPR 2020-737 and Case IPR 2020-738, Jan. 7, 2021.
Exhibit 2044 (Dostie Reference—US20120023433A1) from Patent Owner's Response Under 37 C.F.R. § 42.120 (redacted), Case IPR 2020-737 and Case IPR 2020-738, Jan. 7, 2021.
Exhibit 2045 (US20070080949A1) from Patent Owner's Response Under 37 C.F.R. § 42.120 (redacted), Case IPR 2020-737 and Case IPR 2020-738, Jan. 7, 2021.
Exhibit 2046 (Krohn Reference—US20070080949A1) from Patent Owner's Response Under 37 C.F.R. § 42.120 (redacted), Case IPR 2020-737 and Case IPR 2020-738, Jan. 7, 2021.
Exhibit 2047 (US20070080949A1) from Patent Owner's Response Under 37 C.F.R. § 42.120 (redacted), Case IPR 2020-737 and Case IPR 2020-738, Jan. 7, 2021.
Exhibit 2048 (Perlman Reference—US20070260452A1) from Patent Owner's Response Under 37 C.F.R. § 42.120 (redacted), Case IPR 2020-737 and Case IPR 2020-738, Jan. 7, 2021.
Exhibit 2049 (U.S. Pat. No. 8,798,237) from Patent Owner's Response Under 37 C.F.R. § 42.120 (redacted), Case IPR 2020-737 and Case IPR 2020-738, Jan. 7, 2021.
Exhibit 2050 (Pu Reference—U.S. Pat. No. 8,798,237) from Patent Owner's Response Under 37 C.F.R. § 42.120 (redacted), Case IPR 2020-737 and Case IPR 2020-738, Jan. 7, 2021.
Exhibit 2051 (US20070080949A1) from Patent Owner's Response Under 37 C.F.R. § 42.120 (redacted), Case IPR 2020-737 and Case IPR 2020-738, Jan. 7, 2021.
Exhibit 2052 (Mail, Lewis Hudnell, Outlook Dec. 31, 2020) from Patent Owner's Response Under 37 C.F.R. § 42.120 (redacted), Case IPR 2020-737 and Case IPR 2020-738, Jan. 7, 2021.
Exhibit 2058 (Goldberg Declaration) from Patent Owner's Response Under 37 C.F.R. § 42.120 (redacted), Case IPR 2020-737 and Case IPR 2020-738, Jan. 7, 2021.
Website Screenshots for WayBackMachine for n-e-ware.com, Feb. 15, 2006.
Website Screenshots for WayBackMachine for n-e-ware.com, May-Oct. 2004.
Website Screenshots for WayBackMachine for n-e-ware.com, Feb.-Dec. 2005.
Website Screenshots for WayBackMachine for n-e-ware.com, Oct. 19, 2006.
Website Screenshots for WayBackMachine for n-e-ware.com, Jul. to Aug. 2007.
www.francemobiles.com/telmob/pack/itineris/pa086271.php?from=aol, Mar. 6, 2004.
Ward, et al, "Dasher—A Data Entry Interface Using Contiguous Gestures and Language Models", Nov. 2000.
Petitioner's Request for Rehearing Under 37 C.F.R. § 42.71(d), Case IPR 2020-739, Oct. 22, 2020.
Petitioner's Request for Rehearing Under 37 C.F.R. § 42.71(d), Case IPR 2020-740, Oct. 22, 2020.
Decision Denying Petitioner's Request for Rehearing, 37 C.F.R. § 42.71(d), Case IPR 2020-739, Dec. 17, 2020.
Decision Denying Petitioner's Request for Rehearing, 37 C.F.R. § 42.71(d), Case IPR 2020-740, Dec. 17, 2020.
http://arstechnica.com/gadgets/2013/02/smart-tvs-have-a-serious-communication-problem/ Feb. 10, 2013 (last accessed on Mar. 23, 2021).
https://youtu.be/iY1NMea1VOk Feb. 25, 2020, Screen Shots submitted (video last accessed on Mar. 23, 2021).
https://play.google.com/store/search?q=keytouch%20input&hl=en Dec. 10, 2020 (last accessed on Mar. 23, 2021).
Gargi et al, "QuickSuggest: Character Prediction on Web Appliances", Google, Inc., 2010.
Bellman et al, "A Probabilistic Character Layout Strategy for Mobile Text Entry", 1998.
Ingmarsson et al, "TNT—A Numeric Keypad Based on Text Input Method", vol. 6, No. 1, pp. 639-646, 2004.
Isokoski, "Performance of Menu-Augmented Soft Keyboards", 2004.
MacKenzie, "KSPC (Keystrokes per Character) as a Characteristic of Text Entry Techniques", 2002.
Moffat, "Implementing the PPM data compression scheme", IEEE, 1990.
Office Action dated Aug. 19, 2016 for CA 2,711,400.
Petition for Inter Partes Review of U.S. Pat. No. 9,697,264, IPR2020-00736, May 17, 2020.
Patent Owner's Preliminary Response, IPR2020-00736, Jun. 24, 2020.
Patent Owner's Corrected Preliminary Response, IPR2020-00736, Jul. 15, 2020.
Samsung's Preliminary Reply, IPR2020-00736, Jul. 22, 2020.
Patent Owner's Preliminary Sur-Reply, IPR2020-00736, Jul. 29, 2020.
Decision Denying Institution of Inter Partes Review, IPR2020-00736, Sep. 22, 2020.
Petitioner's Exhibit 1003, Declaration of Clifton Forlines, Ph.D., IPR2020-00736, Mar. 12, 2020.
Petition for Inter Partes Review of U.S. Pat. No. 9,436,354, IPR2020-00737, Mar. 17, 2020.
Patent Owner's Preliminary Response, IPR2020-00737, Jun. 24, 2020.
Patent Owner's Corrected Preliminary Response, IPR2020-00737, Jul. 15, 2020.
Samsung's Preliminary Reply, IPR2020-00737, Jul. 22, 2020.
Patent Owner's Preliminary Sur-Reply, IPR2020-00737, Jul. 29, 2020.
Decision Granting Institution of Inter Partes Review, IPR2020-00737, Sep. 23, 2020.
Petitioner's Exhibit 1003, Declaration of Clifton Forlines, Ph.D., IPR2020-00737, Mar. 12, 2020.
Patent Owner's Exhibit 2003, Declaration of Ravin Balakrishnan, Ph.D., IPR2020-00737, Jun. 24, 2020.
Declaration of Todd K. Viegut In Support of Patent Owner's Preliminary Response, IPR2020-00737, Jun. 24, 2020.
Petition for Inter Partes Review of U.S. Pat. No. 8,370,393, IPR2020-00738, Mar. 17, 2020.
Patent Owner's Preliminary Response to Petition for Inter Partes Review of U.S. Pat. No. 8,370,393, IPR2020-00738, Jun. 24, 2020.
Patent Owner's Corrected Preliminary Response to Petition for Inter Partes Review of U.S. Pat. No. 8,370,393, IPR2020-00738, Jul. 15, 2020.
Samsung's Preliminary Reply, IPR2020-00738, Jul. 22, 2020.
Decision Granting Institution of Inter Partes Review, IPR2020-00738, Sep. 23, 2020.
Patent Owner's Request for Rehearing, IPR2020-00738, Oct. 7, 2020.
Petitioner's Exhibit 1003, Declaration of Clifton Forlines, Ph.D., IPR2020-00738, Mar. 12, 2020.
Patent Owner's Exhibit 2003, Declaration of Ravin BalaKrishnan, Ph. D., IPR2020-0738, Jun. 24, 2020.
Petition for Inter Partes Review of U.S. Pat. No. 8,996,579, IPR2020-00739, Mar. 17, 2020.
Patent Owner's Preliminary Response, IPR2020-00739, Jun. 24, 2020.
Patent Owner's Corrected Preliminary Response to Petition for Inter Partes Review of U.S. Pat. No. 8,370,393, IPR2020-00739, Jul. 15, 2020.
Patent Owner's Corrected Preliminary Response; IPR2020-00739, Jul. 15, 2020.
Samsung's Preliminary Reply, IPR2020-00739, Jul. 22, 2020.
Decision, Denying Institution of Inter Partes Review, IPR2020-00739, Sep. 22, 2020.
Petitioner's Exhibit 1003, Declaration of Clifton Forlines, Ph.D., IPR2020-00739, Mar. 12, 2020.
Patent Owner's Exhibit 2003, Declaration of Ravin Balakrishnan, Ph.D., IPR2020-00739, Jun. 24, 2020.
Petition for Inter Partes Review of U.S. Pat. No. 8,676,852, IPR2020-00740, Mar. 17, 2020.
Patent Owner's Preliminary Response, IPR2020-00740, Jun. 24, 2020.

(56) References Cited

OTHER PUBLICATIONS

Patent Owner's Corrected Preliminary Response, IPR2020-00740, Jul. 15, 2020.
Samsung's Preliminary Reply, IPR2020-00740, Jul. 22, 2020.
Patent Owner's Preliminary Sur-Reply, IPR2020-00740, Jul. 29, 2020.
Decision Denying Institution of Inter Partes Review, IPR2020-00740, Sep. 22, 2020.
Petitioner's Exhibit 1003, Declaration of Clifton Forlines, Ph.D. ,IPR2020-00740, Mar. 12, 2020.
Patent Owner's Exhibit 2003, Declaration of Ravin Balkrishnan, Ph.D, IPR2020-00740, Jun. 24, 2020.
Patent Owner's Sur-Reply, IPR2020-00738, May 10, 2021.
Patent Owner's Sur-Reply, IPR2020-00737, May 10, 2021.
Request for Ex Parte Reexamination of U.S. Pat. No. 9,697,264, Reexamination No. 90/014,759 (May 28, 2021).
Request for Ex Parte Reexamination of U.S. Pat. No. 8,676,852, Reexamination No. 90/014,760 (May 28, 2021).
Request for Ex Parte Reexamination of U.S. Pat. No. 8,996,579, Reexamination No. 90/014,761 (May 28, 2021).
Declaration of Clifton Forlines in Support of Samsung's Requests for Ex parte Reexamination of U.S. Patent Nos. 8,676,852, 8,996,579, and U.S. Pat. No. 9,697,264 (May 27, 2021).
Petition under 1.181 for Reexamination Nos. 90/014,761, 90/014,761, and 90/014,761 (Jul. 28, 2021).
Response to Petition under 1.181 for Reexamination Nos. 90/014,761, 90/014,761, and 90/014,761 (Aug. 11, 2021).
Order Granting Request for Ex Parte Reexamination No. 90/014,759 (Jul. 2, 2021).
Order Granting Request for Ex Parte Reexamination No. 90/014,760 (Jul. 6, 2021).
Order Granting Request for Ex Parte Reexamination No. 90/014,761 (Jul. 6, 2021).
Jun. 11, 2021 Patent Owner's Brief Regarding Additional Discovery from Samsung ('354 Patent), IPR2020-00737 (Jun. 21, 2021).
Jun. 11, 2021 Patent Owner's Brief Regarding Additional Discovery from Samsung ('393 Patent), IPR2020-00738 (Jun. 11, 2021).
Jun. 21, 2021 Demonstrative Exhibits for Kannuu ('354 and '393 Patent IPRs), IPR2020-00737 and IPR2020-00738 (Jun. 21, 2021).
Jun. 30, 2021 Demonstrative Exhibits for Samsung ('354 and '393 Patent IPRs), IPR2020-00737 and IPR2020-00738 (Jun. 30, 2021).
Jul. 20, 2021 Patent Owner's Motion to Strike ('354 Patent), IPR2020-00737 (Jul. 20, 2021).
Jul. 20, 2021 Patent Owner's Motion to Strike ('393 Patent), IPR2020-00738 (Jul. 20, 2021).
Petitioner's Opposition to Kannuu's Motion to Strike ('354 Patent), IPR2020-00737 (Jul. 27, 2021).
Petitioner's Opposition to Kannuu's Motion to Strike ('393 Patent), IPR2020-00738 (Jul. 27, 2021).
Petitioner's Brief Regarding Samsung Discovery, IPR2020-00737 (Jun. 21, 2021).
Petitioner's Brief Regarding Samsung Discovery, IPR2020-00738 (Jun. 21, 2021).
Judgment, Final Written Decision Determining All Challenged Claims Unpatentable, IPR2020-00737 (Sep. 21, 2021).
Judgment, Final Written Decision Determining All Challenged Claims Unpatentable, IPR2020-00738 (Sep. 21, 2021).

\* cited by examiner

| |
|---|
| Andre Jones |
| Anne Parkes |
| John Smith |
| John Sykes |
| John Jones |
| Jane Smith |
| Jim Cook |
| Peter Smith |

FIGURE 7

PROCESS AND APPARATUS FOR SELECTING AN ITEM FROM A DATABASE

CROSS REFERENCE TO RELATED APPLICATIONS

This application is a continuation of U.S. application Ser. No. 16/226,109, filed Dec. 19, 2018, which is further a continuation of U.S. application Ser. No. 15/791,992, filed Oct. 24, 2017, which is a continuation of U.S. application Ser. No. 15/232,511, filed Aug. 9, 2016, now U.S. Pat. No. 9,836,489 issued Dec. 5, 2017, which is a continuation of U.S. application Ser. No. 14/627,914, filed Feb. 20, 2015, now U.S. Pat. No. 9,436,354 issued Jun. 18, 2015, which is a continuation of U.S. application Ser. No. 14/166,465, filed Jan. 28, 2014, now U.S. Pat. No. 8,996,579 issued Mar. 31, 2015, which is a continuation of U.S. application Ser. No. 13/736,548, filed Jan. 8, 2013, now U.S. Pat. No. 8,676,852 issued Mar. 18, 2014, which is a continuation of U.S. application Ser. No. 13/349,204, filed on Jan. 12, 2012, now U.S. Pat. No. 8,375,058 issued Feb. 12, 2013, which is a continuation of U.S. application Ser. No. 11/990,338, filed Aug. 26, 2009, now U.S. Pat. No. 8,140,560, issued Mar. 20, 2012, which is the National Phase application of International Application No. PCT/AU2006/001151, filed Aug. 11, 2006, which designates the United States and was published in English, and which claims the benefit to Australian Provisional Application No. 2005904378, filed Aug. 12, 2005. Each of the foregoing related applications, in their entirety, are incorporated herein by reference.

FIELD OF THE INVENTION

The present invention relates to an improved process and apparatus for selecting an item from a database, and more particularly, but not exclusively, relates to a method and apparatus for rapidly selecting items from a list of items identified by a text field.

BACKGROUND OF THE INVENTION

There are many applications on computing devices which require selection from a list where the item identifier for the list is text based. These include selecting a contact from an address book, selecting a record from a database, selecting a word from a dictionary, etc.

The user of such systems has to enter enough information to narrow a search of the list down to a single entry to be selected. This usually entails entering several of the initial letters of the search term resulting in a smaller subset of the list, then scrolling through the subset to manually point out the desired item.

This can be a cumbersome process requiring the user to be able to enter any letter in their language's alphabet as well as possibly numbers and other symbols. This is particularly onerous on small, hand held devices such as mobile phones, personal digital assistants (PDAs), remote controls, etc.

On hand held devices with a keypad such as mobile phones (FIG. 1), the entry of alphabetic characters as well as numerics and symbols is achieved through a cumbersome system of multiply pressing the 12 number keys (0 to 9 and "*" and "#"). This method has the disadvantages of:

Being a complicated, unnatural system which needs to be learnt,
Requiring accurate presses of generally very small buttons resulting in accidental pressing of adjacent buttons,
Requiring the user to be able to read and discern very small labels on the buttons,
Requiring constant shift of gaze between buttons and screen to track the input,
Only allowing the entry of one character at a time, not a group of characters at a time.

Other handheld devices take input through a touch screen such as PDAs (FIG. 2). These allow text input through generally two methods: an on-screen keyboard and handwriting recognition.

The on-screen keyboard method involves presenting an image of a keyboard on the screen. The buttons on this on-screen keyboard are too small to be selected using fingers so a stylus is required. This results in a slow, error prone selection of individual characters with the disadvantages:

Access to numbers and additional symbols usually requiring at least two presses as they require the keyboard to go into another mode to allow access to them,
Small key images are hard to see for those with any impairment of vision and hard to select for those with limited dexterity,
Characters are only entered one at a time.

Handwriting recognition systems have the disadvantage of a high error rate in recognizing characters unless either the system is trained with the user's handwriting or the user learns a set of distinctive ways to input letters that are amenable to the device's programming. This method has the disadvantages of:

Needing a stylus for input,
Being slow to enter each letter,
Requiring a constant cycle of entry, checking of accuracy of the entry and correction of misinterpretation of entries,
Characters are only entered one at a time.

Even using a fully fledged keyboard to specify the characters to select an object has disadvantages:

It is still necessary to enter one character at a time,
It is still necessary to enter enough characters to generate a manageable subset list and then select from it, the alternative would be to enter sufficient characters each time to uniquely identify the entry which may require almost all of the entry to be specified,
Except for adept touch typists there is still a need to constantly move one's gaze between the keyboard and the screen.

There is need for an improved method of selecting items from a list.

SUMMARY OF THE INVENTION

In accordance with a first aspect, the present invention provides a method of selecting database items from a database, the database items being indexed by a list of item identifiers, the method comprising the steps of:

generating an initial display including one or more parts of item identifiers for selection,
enabling selection of the one or more parts and in response to selection of the one or more parts,
generating a display of a further one or more parts for selection, and
enabling selection of the further one or more parts in order to add to the selected one or more parts to build a larger part or whole of an item identifier.

In one embodiment, the invention entails a method of selecting an item from a list indexed by a text based field. Preferably, the invention allows for selection from the list by presenting one or more word sections, (the item identifier parts in this embodiment), containing one or more characters, at a time in a list for the user to select from.

Preferably, the word sections presented are based on a knowledge of the text indices in the list and the likelihood of the word sections to be the ones the user wants to enter.

Preferably, where the list of expected word sections does not contain the desired entry the user is given an option to list "more" word sections and is presented with a new list which indicates the next most likely set of word sections.

Preferably, when a word section is selected, a new list of word sections is presented to form a continuation of the text selection based on the word sections selected so far being the start of the desired selection Preferably, once all the word sections have been selected, the item in the list is identified and any associated action, such as presenting a telephone book contact's contact details, is carried out.

Preferably, the word sections are presented as labels on the screen to be selected by various methods depending on the type of device.

Preferably, where the device is a PC, the word sections would be selected by mouse presses or mapping to keyboard keys.

Preferably, where the device has a touch screen such as PDA or Tablet PC, the word sections would be selected by pointing at the labels with either a finger or stylus.

Preferably, where the device has a small screen and a joystick such as a mobile telephone or watch sized device, the word sections should be selectable from a menu which indicates which word section is selected for corresponding movements of the joystick.

Preferably, where the device has function keys with the ability to associate an on-screen label with a button press the word sections would be presented for selection as labels with corresponding function keys.

In accordance with a second aspect, the present invention provides a method of selecting database items from a database, the database items being indexed by a list of item identifiers, comprising the steps of enabling a display of one or more parts of item identifiers for selection, the item identifiers being generated on a display being chosen for generation in accordance with predetermined criteria.

In accordance with a third aspect, the present invention provides an apparatus for selecting database items from a database, the database items being indexed by a list of item identifiers, the apparatus comprising a display, an input means, a generating means for generating an initial display including one or more parts of item identifiers for selection, means for enabling selection via the input means of the one or more parts, means responsive to selection of the one or more parts for generating a display of a further one or more parts for selection, means enabling selection via the input means of the further one or more parts, and addition means to add the further one or more parts to the selected one or more parts to build a larger, or whole of an item identifier, In accordance with a fourth aspect, the present invention provides an apparatus for selecting database items from a database, the database items being indexed by a list of item identifiers, comprising a means enabling a display of one or more parts of item identifiers for selection, the means selecting the item identifiers for display in accordance with predetermined criteria.

BRIEF DESCRIPTION OF THE DRAWINGS

Features and advantages of the present invention will become apparent from the following description of embodiments thereof, by way of example only, with reference to the accompanying drawings, in which:

FIG. 7 is a representation of an example table of words.

DESCRIPTION OF PREFERRED EMBODIMENT

The following description of the present invention relates to selection of a contact from an address book of a mobile telephone. The invention is however not limited to this application and may be implemented on any device with computational processing ability on any list which is indexed by a text based value.

Figure 1:
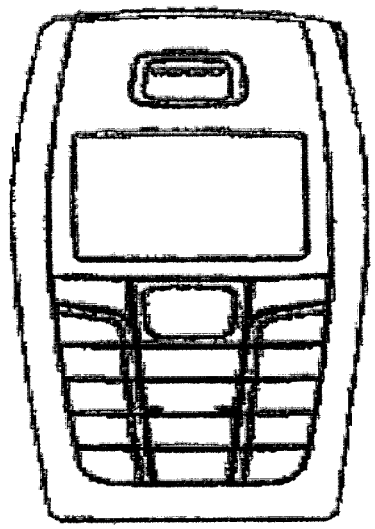
FIG. 1 is a representation of a traditional mobile telephone layout.
Figure 2:
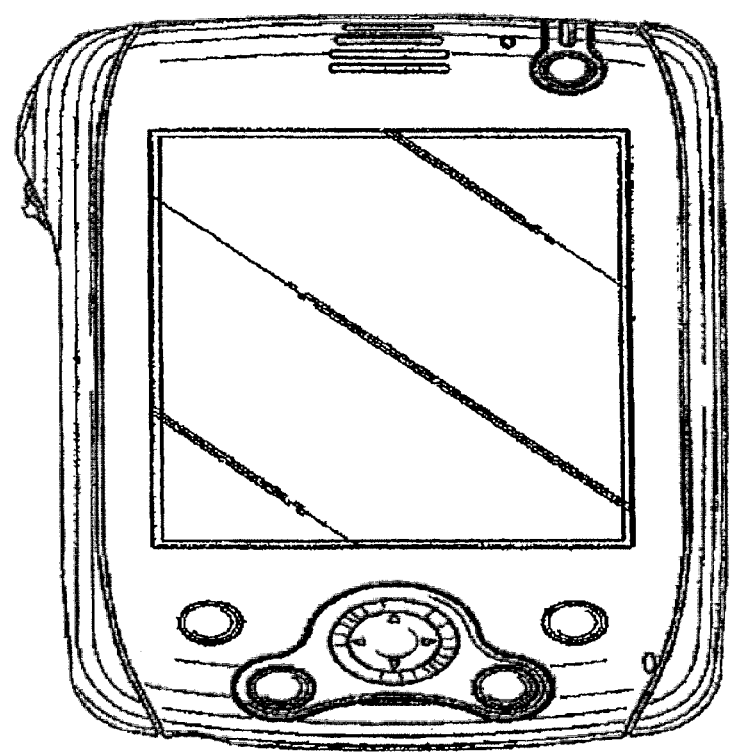
FIG. 2 is a representation of a touch screen input device.
Figure 3:
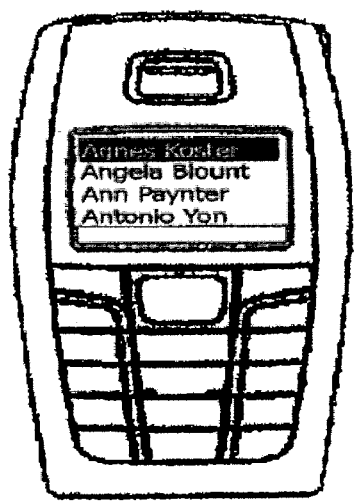
FIG. 3 is a representation of a traditional address book at start of selection process. Image shows first four entries in address book with selection indicator over first one. There is no entry in search refinement field.
Figure 4:
FIG. 4 is a representation of a selection from reduced list of contacts from an address book using a traditional selection process. Image shows user has entered "je" to refine the search to a manageable number of entries and then used the cursor to move the highlight to specify "Jessie Lares"

The conventional way of selecting a contact from an address book on a mobile telephone entails the user following the sequence:

1. The user starts the address book application and is presented with a the full list of all contacts in the address book, (FIG. 3)
2. Using the multi-tap feature on the device to enter characters with multiple presses of keypad keys, the user enters the first letter of the name they want to find,
3. This results in the list of names presented changing from the entire address book to only those names starting with the specified letter,
4. The user can now decide to use the joystick to move the selection to the desired contact and select it (FIG. 4), if however the list is still too long the user goes back to step 2 above to enter the next character and proceeds until the list is short enough to find the contact,
5. Once the contact is selected, their information is presented and the user is given the option of calling them, emailing them, etc.

In an embodiment of the current invention the above process can be streamlined greatly by presenting the user with the following sequence:

1. The user starts the address book application which is implemented based on the present invention, the user is presented with 4 strings in a circular menu indicating the strings are selected by movements of the joystick in the directions left, right, up and down (FIG. 5), these initial four options are the four most likely word sections in the database at the start of a contact name based on an analysis of the frequency of words in the address book;
2. If the user sees the word section that starts, or is a continuation of, the contact they want to select they move the joystick in the indicated direction to select that word section, appending it to the name thus far specified. The next set of most likely word sections which continue the name thus far specified are then presented (FIG. 6), if the selection is not complete the user repeats this step 2;

3. If the word section the user desires is not presented they activate the "more" function, in this case a press in of the joystick to be presented with the next most likely set of four options to continue the name thus far specified, the user then repeats step 2;

4. Once the user has completed the name the user is then presented with their information and the user is given the option of calling them, emailing them, etc.

Using an address book application implemented with the present invention as described above has the following advantages over the traditional system as described previously:

- There are significantly less key presses or movements of the joystick as the mostly letters are presented first and it is likely that it will be possible to specify several letters of the name at a time,
- Only the joystick has been used so there is no need to transfer the thumb or finger between buttons and risk mis-hitting buttons,
- The labels selected from are presented on the screen rather than being printed on the buttons meaning the user is able to maintain their gaze on the screen the entire time rather than constantly flick between the screen and the keypad,
- Another advantage of on-screen labels is that it is possible to increase the size of the labels to make them more readable for those with vision impairment, an option not possible for labels on small keypad keys.

It should be obvious to someone skilled in the art that the present invention has much broader application than just the example listed above, as well as a mobile phone, the present invention can be used to improve list selection on other devices including but not limited to personal computers, tablet PCs, PDAs, remote controls and small watch sized devices.

Also, as well as the above sample application the present invention can be used to select an item from any list which is indexed by a text based value. The list could be of any size from a handful of entries to a large database of thousands or even millions of entries. The list does not just have to be contacts in an address book, applications could include but are not limited to selection from any text indexed database, for example a list of products in an inventory, selection of word definitions from a dictionary, selection of answers from an FAQ (Frequently Asked Question) document, etc.

Implementation

Preferably the present invention would be implemented as software within an application which maintains or allows viewing of some list of information. The list would be accessible through an index field which is text based. The text may be based on any language or symbolic system as long as it can be represented on the screen for selection.

Table of Values

FIG. 7 shows an example table of words which may be the text string indices from which a selection is to be made.

Hierarchical Tree

In order to facilitate selection from the list of text indices using the present invention, the list needs to be processed as a hierarchical tree of word sections. In one variation of the implementation of the present invention in software there may be a pre-processing phase where the list of indices is analysed and the hierarchical tree is generated and stored in some computer accessible memory to assist processing.

The hierarchical tree of word sections is an internal representation of the structure of the words in the list. Where words share the same starting letter or letters those words are added under the same node, where words diverge a branch in the hierarchical tree is formed. This process continues to form further entries and branches down the tree to correspond with the subsequent letters in the words.

Figure 8:
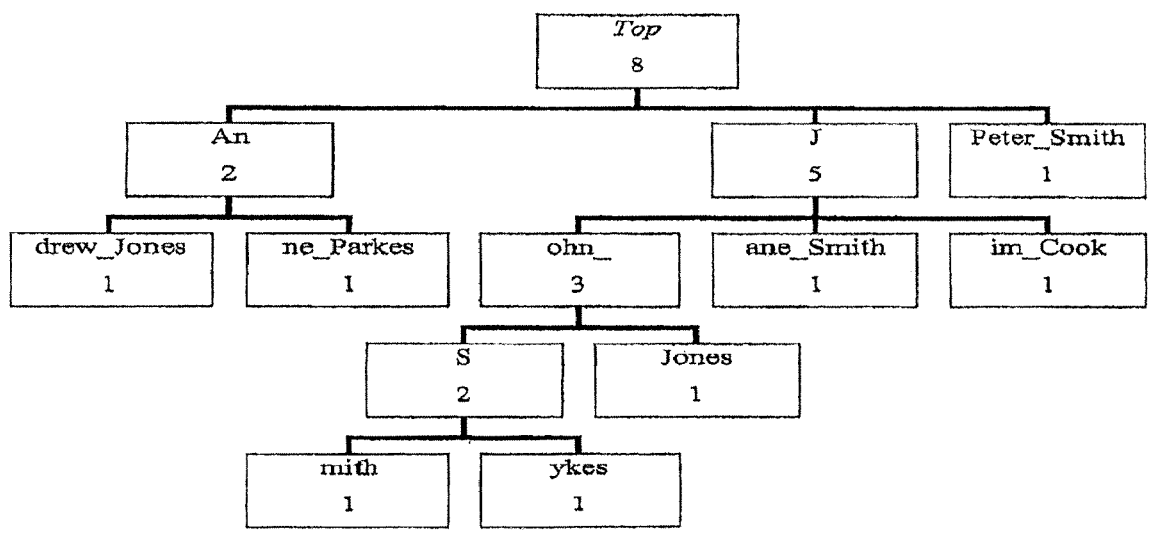
FIG. 8 is a representation of an example structure of tree for words in example table.

As an example, the logical hierarchical tree structure for the list in FIG. 7 is illustrated in FIG. 8. As can be seen, where words have common letters in sequence they share a node in the tree structure, where the characters diverge (for example after the first "n" for "Andrew Jones" and "Anne Parkes") a branch in the tree is formed.

Node Rankings

Associated with each end node is a ranking value. In the most basic of systems this value would be one for each end node but in other systems it could be any number representing a ranking, for instance for a phone book application the number could be the number of times that contact was accessed giving more frequently used contacts higher priority.

For the branch nodes in the tree their rankling value is the sum of all the ranking values of the nodes immediately below them in the tree.

Presenting Options

Figure 9:
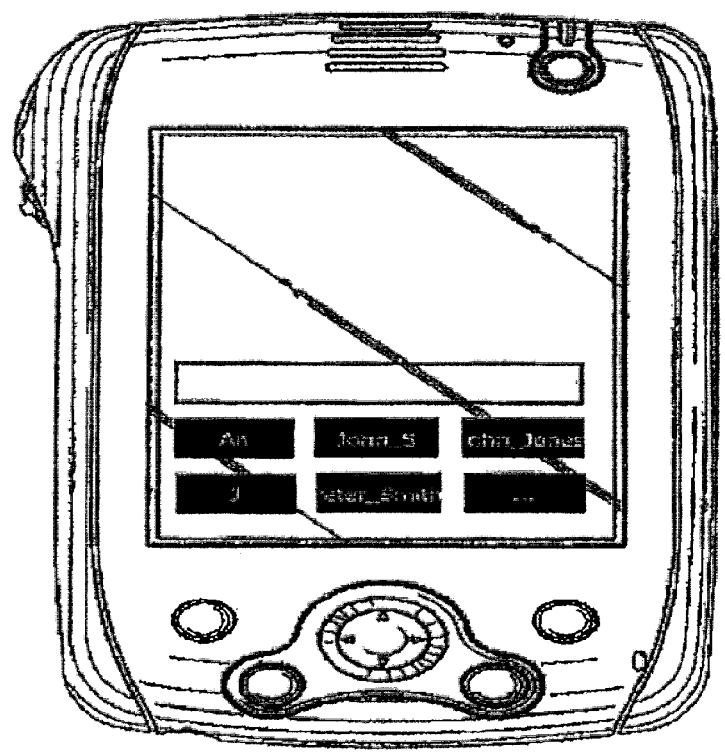
FIG. 9 is a representation of a touch screen option selection.

In an implementation of the present invention, the system presents word section options. The number of options presented depends on the mode by which the options are being selected. On a touch screen the options may be in a 3 by 2 grid to be selected by a stylus (FIG. 9) in this case the system would be generating up to 5 word sections at a time leaving the sixth menu option to indicate "more" where none of the presented 5 options is applicable.

In the case of a menu driven by a joystick such as that which is commonly found on a mobile phone the system could present up to 4 word section options indicated by presses of the joystick in the four directions (left, right, up and down) and having a press in of the joystick to indicate "more".

Each word section option presented corresponds to a node in the notional hierarchical tree. In order to determine which nodes to present the system will use the following logic:

1. Exclude nodes which have already been presented (i.e. they have been presented to the user and the user has selected "more" to indicate none of those presented are appropriate)
2. Select the nodes with the highest ranking values
3. When assessing the ranking value subtract the ranking value of any nodes below this node in the tree that have been selected. For example, in FIG. 8 ranking value for the node with the string "J" is 5 but if the node for "ohn_" is included in the selection the ranking for "J" should be treated as 2, the sum of the rankings of the unselected nodes.
4. Point 3 above means some iterations may be performed to select the optimum node set
5. Select up to the number of menu choices that are presentable.

Thus for our example tree in FIG. 8 if four word section are to be selected for a joystick based interface, the first four options would be:

| WORD SECTION | RANKING VALUE |
|---|---|
| "An" | 2 |
| "John_" | 3 |
| "J" | 2 (ranking of "J" minus ranking of "ohn_" which is presented separately) |
| "Peter Smith" | 1 |

Figure 5:
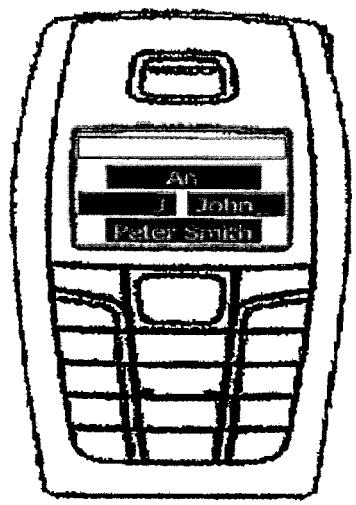
FIG. 5 is a representation of an opening joystick based selection menu using the present invention.

FIG. 5 shows how this selection set may be represented on a joystick based interface.

If the user was to select the "John_" option then the options to be presented would be:

| WORD SECTION | RANKING |
|---|---|
| "Smith" | 1 |
| "Sykes" | 1 |
| "Jones" | 1 |

Figure 6:
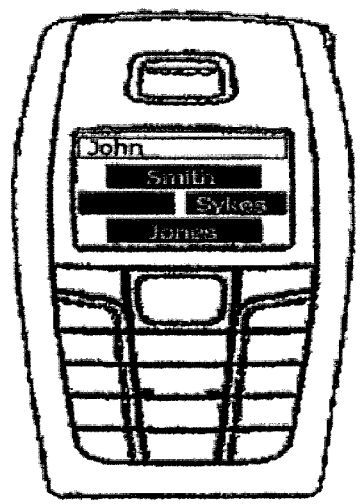
FIG. 6 is a representation name partially specified using the present invention.

FIG. 6 shows how this selection set may be represented on a joystick based interface.

If the user was to select the "An" option from the original menu then the options to be presented would be:

| WORD SECTION | RANKING VALUE |
|---|---|
| "drew_Jones" | 1 |
| "ne_Parkes" | 1 |

Once the user selects a word section that takes them to the end of the index then the item has been uniquely specified and the system can then perform the processing applicable to the application. In the example of a phone book system the user may be presented with options to initiate a phone call or send a text message to the contact.

As can be seen from the above example, even using just a joystick it is possible to very rapidly narrow a text based search to a single entry with very few joystick actions using the present invention. While the example presented is based on a trivial number of entries, the present invention provides a significant increase in efficiency of selections from lists with many more items as well.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A system for selecting items, the system comprising:
an output display of a television;
a remote control keypad with an up, down, left, right, select functionality; and
a computer processor contained within the television configured to:
associate the items with corresponding item identifiers;
generate a first display on the output display, the first display comprises a part of an item identifier corresponding to a first set of items and a part of an item identifier corresponding to a second set of items in a database;
enable selection, by the remote control keypad, of one of the two parts of the item identifiers associated with a selected set of items;
generate, in response to the selection of the one of the two parts of item identifiers, a further display on the output display, the further display comprises an additional part of an item identifier corresponding to a subset of the selected set of items and another additional part of an item identifier corresponding to another subset of the selected set of items;
enable selection, by the remote control keypad, of one of the two additional parts of the item identifiers;
combine the selected one of the two parts of the item identifiers with the selected one of the two additional parts of the item identifiers to create a larger part of the item identifiers; and
display the larger part of the item identifiers on the output display, wherein
the additional parts of the item identifiers are shorter than a complete item identifier,
the first set of items and the second set of items are mutually exclusive of one another, and
the up, down, left, right, select functionality of the remote control keypad enables the selections of parts of item identifiers specifically positioned in a circular menu on the output display.

* * * * *